United States Patent [19]

Nakagawa

[11] Patent Number: 5,787,941
[45] Date of Patent: Aug. 4, 1998

[54] DEVICE FOR FEEDING A MIXTURE OF FRICTION MATERIALS

[75] Inventor: Mitsuhiko Nakagawa, Itami, Japan

[73] Assignee: Sumitomo Electric Industries, Ltd., Osaka, Japan

[21] Appl. No.: 783,105

[22] Filed: Jan. 14, 1997

[30]     Foreign Application Priority Data

Jan. 16, 1996  [JP]  Japan .................................. 8-004779

[51] Int. Cl.⁶ ...................................................... B65B 43/42
[52] U.S. Cl. ............................ 141/129; 198/597; 198/607
[58] Field of Search ................................ 141/129, 250,
141/251, 252, 255, 256, 257, 270, 283;
198/594, 597, 607, 303, 587, 436, 447,
601; 222/252, 415

[56]     References Cited

U.S. PATENT DOCUMENTS

| | | | |
|---|---|---|---|
| 2,982,445 | 5/1961 | Koble | 222/415 |
| 3,435,967 | 4/1969 | Sackett, Sr. | 198/594 |
| 3,530,973 | 9/1970 | Rossi | 198/594 |
| 4,619,576 | 10/1986 | George et al. | 198/594 |

*Primary Examiner*—David J. Walczak
*Assistant Examiner*—Timothy L. Maust
*Attorney, Agent, or Firm*—Wenderoth, Lind & Ponack, L.L.P.

[57]     ABSTRACT

A feed device which can feed a friction material mixture into a mold so that its thickness will be uniform in the mold to improve the quality and stability of the friction member obtained by heating and pressure-molding the material mixture in the mold. The feed device has a feeder for feeding a friction material mixture supplied from a constant-feed device at a constant rate to a designated area. The feeder comprises a main conveyor and sub-conveyors provided right under the delivery end of the main conveyor and inclined with respect to the main conveyor. The material mixture is partially dropped from the delivery end of the main conveyor onto the sub-conveyors, and fed to the delivery ends of the sub-conveyors and dropped into a mold having a hood. The shape of the delivery end of the feeder can be adjusted substantially to the arcuate shape of the mold cavity. By further moving the feeder and the mold relative to each other in the X-axis direction, the thickness of the material fed into the mold will be even more uniform.

6 Claims, 2 Drawing Sheets

DEVICE FOR FEEDING A MIXTURE OF FRICTION MATERIALS

BACKGROUND OF THE INVENTION

This invention relates to a feed device for uniformly feeding a mixture of friction materials into a weighing unit or a mold to manufacture friction members for use in brakes and clutches of vehicles such as automobiles and railroad trains and industrial machines, and in particular, pads for large disk brakes.

For its peculiar intended use, a friction member contains fibrous reinforcing materials, a binder for binding them to retain the shape of the entire member, and fillers for adjusting the friction and wear properties. Fillers used include metallic, inorganic and organic powders and granules. These materials are mixed together and molded by heating to a predetermined shape according to the intended use.

Fibers, granules and powders as the raw materials for a friction member have to be mixed together as uniformly as possible. However uniform mixing is rather difficult because the materials tend to separate or segregate due to differences in shape and specific gravity among the materials when they are moved or dropped.

Unlike ordinary powders and granules, a mixture of such friction materials has to be handled with special care when moving and fractioning it, so that mechanical handling of such materials has been considered very difficult.

But now, handling of such friction materials is gradually mechanized thanks to the development of automatic weighing machines and pre-molding machines which make possible normal-temperature pressurization.

For example, manual weighing is being replaced with automatic weighing by combining a weighing machine with a screw feeder used with an extruder, a feeder having a spiral ribbon inserted in a cylinder and rotated to feed the mixture, or a constant-feed device with belt conveyors disclosed in Unexamined Japanese Utility Model Publication 2-61816.

A weighing machine having a material separating device at its leading end (disclosed in Unexamined Japanese Patent Publication 6-191646) achieves as high a weighing accuracy as achieved with manual weighing.

Not only a friction material mixture but other powders and granules tend to heap up when they are supplied from above. The portion of the material under the peak is compressed more markedly by its own weight than the other portions, so that the material density tends to be higher under the peak than at the other portions of the material. This tendency is conspicuous with a friction material mixture because the fibers in the mixture are liable to get tangled with each other. This influences the density distribution of the end product.

This tendency remains even after pre-molding and heat and pressure molding, and is especially remarkable with a mixture containing much fibers and thus low in flowability.

Thus, in order to produce an end product with uniform density, it is important to put the mixture in the mold so that its thickness is uniform.

For small or block-shaped end products, the material can be put in the mold so that its thickness is uniform because the mold has a width substantially equal to the width of the material discharge port of the automatic weighing machine. For arcuate or doughnut-shaped or large members, the mixture tends to gather at a single point or along a line in the mold, making it difficult to mold an end product with uniform density.

A friction member which has large variations in density is unstable in frictional properties, and results in unsuitable performance of a brake or clutch.

Thus, the need has been acute for a device which can uniformly feed a friction material mixture into a mold, particularly for the manufacture of pads for large brakes having a broad frictional area.

An object of the present invention is to provide a device which makes it possible to mechanically feed a fibrous, low-fluidity material mixture uniformly into a weighing unit or mold to make uniform the density of the a friction member having a uniform density.

SUMMARY OF THE INVENTION

According to the present invention, the feeder comprises a main conveyor having a delivery end for feeding a mixture of materials fed from a constant feed unit at a constant rate to the delivery end, and a plurality of sub-conveyors provided under the delivery end of the main conveyor.

The sub-conveyors are inclined with respect to the main conveyor at a required angle so as to partially overlap the main conveyor. The main conveyor and the sub-conveyors are driven in sync with one another, and the mixture of materials on the main conveyor is partially dropped onto the sub-conveyors and then into a weighing unit or mold.

Preferably, the feed device further comprises a means for turning the sub-conveyors to change the angle of the sub-conveyors with respect to the main conveyor, and/or a means for moving the sub-conveyor and the main conveyor relative to each other so as to change the position of the portion of each of the sub-conveyors where they overlap the main conveyor. More preferably, the feed device further comprises a means for moving the feeder and the weighing unit or mold relative to each other in a longitudinal direction. Preferably both of the angle adjusting means and the relative movement means should be used to move the feeder and the weighing unit or mold relative to each other while turning the sub-conveyors, and/or additionally moving the main conveyor and the sub-conveyors relative to each other.

A friction member is formed, as described above, from a mixture of materials having different shapes and specific gravities, such as fibers, powders and granules. Such a mixture has to be handled with special care. It is important that the material mixture in a mold have a uniform thickness, because the mixture tends to be compressed by its own weight. If the material put in the mold has a uniform thickness, no difference in specific gravity will be created at the friction interface, so that the friction member formed therefrom will be uniform and show stable friction properties. If, on the other hand, differences in specific gravity are large, the friction member will act differently at different parts of its friction surface. This destabilizes frictional properties.

Even a cylindrical feed device can stably feed the material mixture if the feed amount is reduced sufficiently. But a constant feed conveyor is advantageous because it can feed a material mixture more quickly and uniformly than a cylindrical feed device.

There are few rectangular disk brake pads because such pads are difficult to use. Most of the disk brake pads have arcuate shapes. Use should be made of a device which can feed the material mixture uniformly along such a shape of the friction member in a short time.

Taking this into consideration, it is preferable to use as a feeder a constant feed conveyor, particularly a conveyor having a delivery end shaped to correspond to the shape of the cavity of the mold. Also, it is preferable to be able to move the conveyor and the mold relative to each other to move the feeding point for mass-productivity and uniform feeding of the material mixture.

According to the present invention, a feeder comprises a main conveyor and a plurality of sub-conveyors whose inclination angles can be changed freely so that the delivery end of the feeder can be adjusted substantially to the shape of the pad. The pad has an arcuate shape as mentioned above. Thus, although the delivery end of each conveyor is straight, by changing the inclination angles of the sub-conveyors (this is possible because the sub-conveyors are provided under the delivery end of the main conveyor), it is possible to adjust the shape of the delivery end of the entire feeder substantially to the arcuate shape of the pad. The shape of the delivery end of the main conveyor is adjustable to a particular arcuate shape by changing the inclination angle of the sub-conveyor and the portion at which each sub-conveyor overlaps the main conveyor.

According to the present invention, the feeder of the feed device has a delivery end whose shape is adjustable substantially to the shape of a weighing unit or mold. In another arrangement, the feeder delivery end and the mold are horizontally moveable relative to each other to move the material feed point. In either case, it is possible to feed the material mixture to a desired point with high accuracy. Even if the material feed point is fixed or the material is not fed to a desired point, the material mixture is less likely to gather at specific points. Thus, it is possible to disperse the material mixture and put it uniformly in the weighing unit or mold when weighing it before and after molding. Since the mixture is put in the mold uniformly, the material is less likely to be locally compressed in the mold by its own weight, so that its density is kept uniform.

The friction member thus manufactured is small in variation in specific gravity and will show stable friction properties even if the friction member is a large disk brake pad.

A mold for a large pad is correspondingly large in the length of its cavity. Thus, it is advisable to move the feeder and such a mold relative to each other in the direction of length of the cavity of the mold (feeding direction of the main conveyor) to disperse the material mixture uniformly over the entire area of the cavity.

If the material mixture is fed into a mold for a pad from its side having a larger arc toward the small-arc side, the feeder and the mold should be moved relative to each other while turning the sub-conveyors to reduce the arc of the delivery end of the feeder in conformity with the decreasing arc of the mold. With this arrangement, it is possible to uniformly feed a material mixture into even a mold having a cavity whose width changes gradually, without the possibility of the mixture spilling from the mold.

By using a larger number of sub-conveyors, it is possible to adjust the shape of the delivery end of the feeder more accurately to the arcuate shape of the mold. But for easy maintenance and from an economical viewpoint, the sub-conveyors should be as few as possible.

Actually, two sub-conveyors would be enough to adjust the shape of the delivery end of the feeder to the shape of the mold by changing their inclination angles and the point where the sub-conveyors overlap the main conveyor.

Other features and objects of the present invention will become apparent from the following description made with reference to the accompanying drawings, in which:

DETAILED DESCRIPTION OF THE PREFERRED EMBODIMENT

Figure 1:
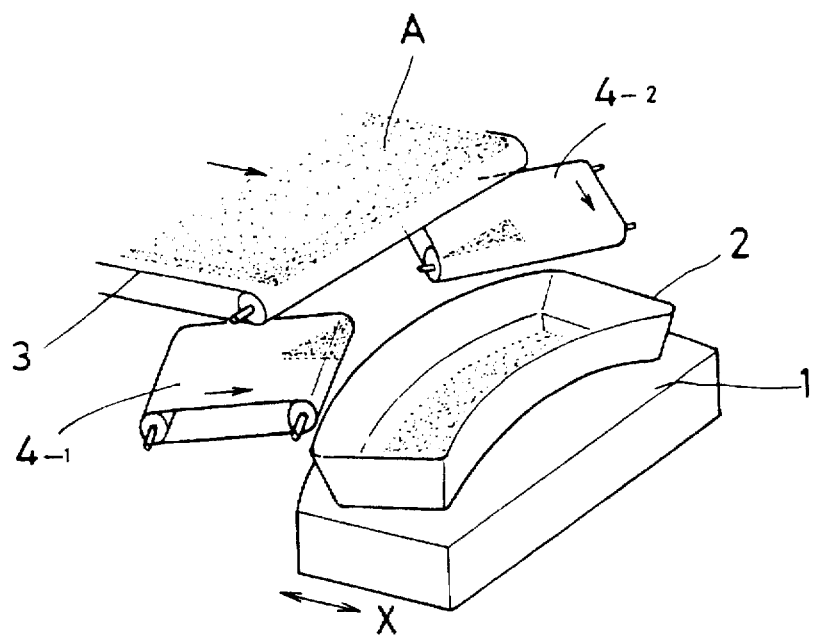
FIG. 1 is a schematic perspective view of a feed device of an embodiment of the present invention.

FIG. 1 schematically shows a feed device embodying the present invention. Numeral 1 in the figure indicates a mold used to mold a friction member from a mixture of friction materials. A mixture A of friction materials is fed into the cavity of the mold 1 through a funnel-shaped hood 2 as a feed guide mounted on top of the mold.

The feed device has a feeder comprising a main belt conveyor 3, and two sub-belt conveyors 4-1 and 4-2 provided under both sides of the delivery end of the main conveyor 3. The sub-belt conveyors 4-1 and 4-2 are at an angle in opposite ways i.e. toward each other, and driven in sync with the main belt conveyor 3.

The mixture A of friction materials is dropped onto the main belt conveyor 3 from a constant feed unit (not shown) so that it will form a strip of uniform width and thickness when fed onto the conveyor. At the delivery end of the conveyor 3, part of the mixture A at the center of the strip drops directly into the mold 1, while part of the mixture A on both sides of the strip is dropped onto the underlying sub-belt conveyors 4-1 and 4-2, fed thereon in an oblique direction and dropped from their delivery ends into the mold 1. The delivery ends of the conveyors form a substantially arcuate line conforming in shape to the arcuate top edge of the cavity of the mold, so that the mixture A can be fed into the mold over the entire length along the arcuate edge of the mold.

In operation, the main conveyor 3 and the sub-conveyors 4-1, 4-2 may be activated at fixed positions, while moving the mold 1 in the X-axis direction with a horizontal moving means such as a power-driven slide table (not shown) to feed the mixture A into the mold 1. Since the mixture is fed into the mold 1 while moving it in the X-axis direction, the mixture A can be put in the mold 1 with uniform thickness over the entire area of its cavity even if the mold has a large length (X-axis dimension).

Instead of moving the mold, the feeder, i.e. the conveyors may be moved. The point is to move the mold and the conveyors relative to each other. The mold or the conveyors may be moved continuously or stepwise relative to each other. Preferably, they are repeatedly moved toward and away from each other to make uniform the thickness of the mixture A in the mold.

By moving and turning the sub-belt conveyors 4-1, 4-2 to change the overlapping points or angles between the main conveyor and the sub conveyors,it- It is possible to change the shape of the arcuate line formed by their delivery ends so as to conform to the shape and size of the arcuate edge of the cavity of the mold 1.

Figure 2:
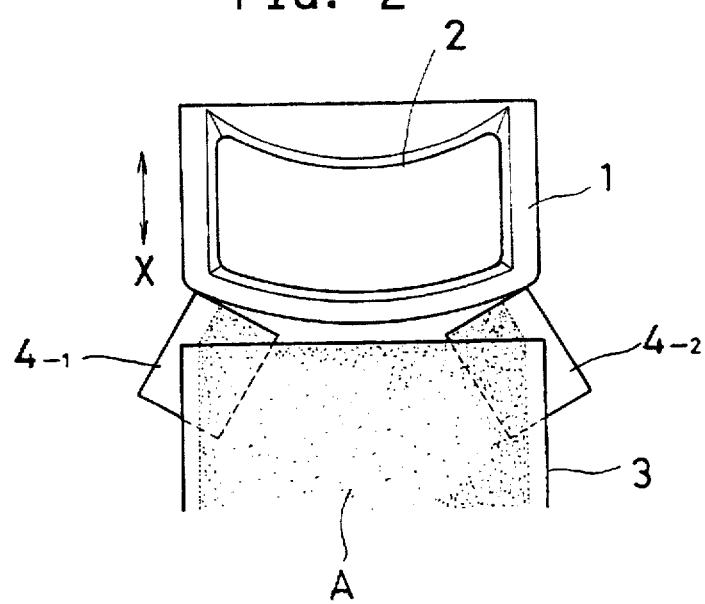
FIG. 2 is a plan view explaining how a friction material is put in a mold having a constant width.

FIGS. 2 and 3 show the operation of the feed device of the embodiment. The mold 1 shown in FIG. 2 is used to mold a friction member having a uniform width and arcuate inner and outer edges which are parallel to each other. Since the width is uniform, there is no need to change the angle of the sub-conveyors 4-1, 4-2 relative to the main conveyor 3 while feeding the mixture A into the mold. That is, simply by moving the feeder and the mold relative to each other, the mixture A can be delivered to the mold with uniform thickness.

Figure 3A:
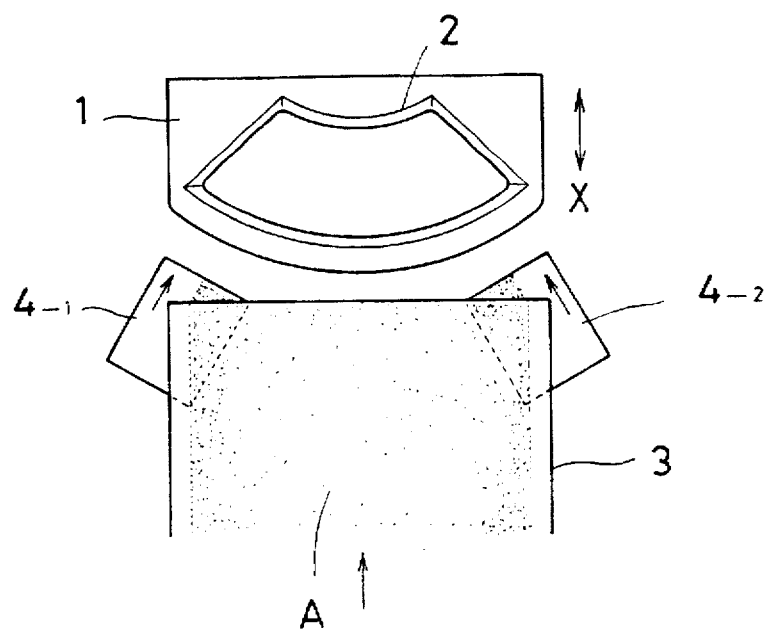
FIGS. 3A and 3B are plan views showing how a friction material is put in a mold of the type whose width changes gradually.
Figure 3B:
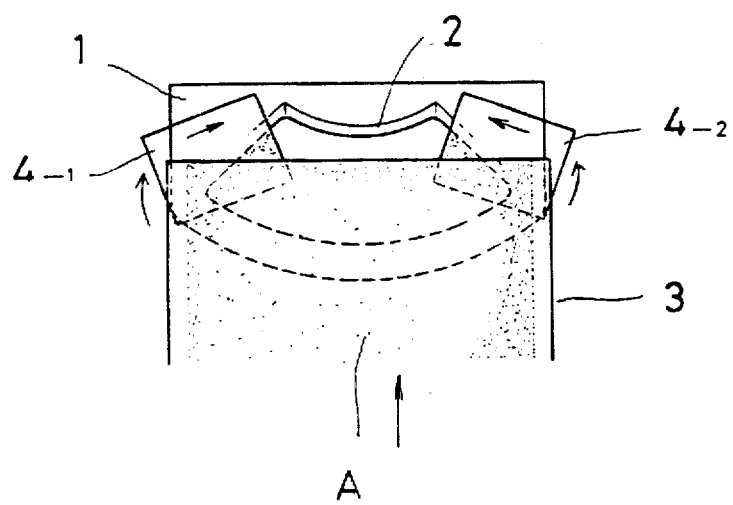

But if the mold cavity's width is not uniform but narrows gradually in the X-axis direction as shown in FIG. 3A, the mixture A on both sides of the conveyor 3 will partially spill over the hood 2 if the angle of the sub-conveyors with respect to the main conveyor is fixed. Thus, as shown in FIG. 3B, the sub-conveyors are gradually turned inwardly with respect to the main conveyor 3 as the mold 1 moves in the X-axis direction toward the feeder so that the mixture A dropped on to the sub-conveyors 4-1 and 4-2 will drop into the mold 1. This will avoid spillover.

Even if the mold cavity has irregular side edges, it is possible to put all the mixture A into the mold by adjusting the angles of the respective sub-conveyors.

The sub-conveyors can be moved and turned by conventional techniques.

With this arrangement, it is possible to feed a friction material mixture into a desired area so that the material in the desired area will have a uniform thickness. The friction member formed is thus uniform in density, and stable in frictional properties and quality.

The feed device according to this invention is especially suited for the production of large brake pads.

What is claimed is:

1. A feed device for feeding a mixture of friction materials into a weighing unit or a mold, said feed device comprising:
    a main conveyor for feeding the mixture of friction materials at a constant rate, said main conveyor having a delivery end and a longitudinal axis; and
    a plurality of sub-conveyors provided below said delivery end of said main conveyor, each of said sub-conveyors being oriented at an angle with respect to said longitudinal axis of said main conveyor,
    wherein said main conveyor partially overlaps each of said sub-conveyors such that a portion of the mixture of friction materials fed by said main conveyor is dropped onto said sub-conveyors and then into the weighing unit or mold, and said main conveyor and said sub-conveyors can be driven in sync with one another.

2. The feed device as claimed in claim 1, wherein each of said sub-conveyors are turnable in order to change the angle of said sub-conveyors with respect to said longitudinal axis of said main conveyor.

3. The feed device as claimed in claim 1, wherein said sub-conveyors and main conveyor are movable relative to each other in order to change the position where said delivery end of said main conveyor overlaps said sub-conveyors.

4. The feed device as claimed in claim 1, wherein said main conveyor has a feeding direction, and the position of said main conveyor and said sub-conveyors are movable relative to the weighing unit or mold along said feeding direction of said main conveyor.

5. The feed device as claimed in claim 2, wherein said main conveyor has a feeding direction, and the position of said main conveyor and said sub-conveyors are movable relative to the weighing unit or mold in said feeding direction of said main conveyor.

6. The feed device as claimed in claim 3, wherein said main conveyor has a feeding direction, and the position of said main conveyor and said sub-conveyors are movable relative to the weighing unit or mold in said feeding direction of said main conveyor.

* * * * *